United States Patent [19]

Wooley et al.

[11] Patent Number: 5,149,130
[45] Date of Patent: Sep. 22, 1992

[54] LINER FOR INFLATABLE OCCUPANT RESTRAINT CUSHION

[75] Inventors: Robert G. Wooley, Westland; Tai L. Chan, Troy, both of Mich.

[73] Assignee: General Motors Corporation, Detroit, Mich.

[21] Appl. No.: 704,770

[22] Filed: May 28, 1991

[51] Int. Cl.$^5$ ............................................. B60R 21/20
[52] U.S. Cl. .................................................. 280/743
[58] Field of Search ............... 280/736, 740, 741, 743, 280/728, 729

[56] References Cited

U.S. PATENT DOCUMENTS

| | | | |
|---|---|---|---|
| 3,799,575 | 3/1974 | Kurze et al. | 280/743 |
| 3,843,151 | 10/1974 | Lewis | 280/736 |
| 4,566,242 | 1/1986 | Dunsworth | 52/573 |
| 4,878,690 | 11/1989 | Cunningham | 280/736 |
| 5,028,070 | 7/1991 | Bender | 280/741 |
| 5,062,664 | 11/1991 | Bishop et al. | 280/743 |

FOREIGN PATENT DOCUMENTS

| | | | |
|---|---|---|---|
| 2225291 | 5/1990 | United Kingdom | 280/728 |
| 9011914 | 10/1990 | World Int. Prop. O. | 280/728 |

OTHER PUBLICATIONS

McMaster-Carr Supply Company Catalog-p. 2259.

Primary Examiner—Mitchell J. Hill
Assistant Examiner—Paul Dickson
Attorney, Agent, or Firm—Charles E. Leahy

[57] ABSTRACT

An occupant restraining inflatable cushion apparatus includes a gas generator which generates a hot gas to inflate an inflatable fabric cushion of nylon-like material which is packaged about the gas generator in a deflated condition. The improvement comprises at least a portion of the inflatable cushion closest to the gas generator being a fabric having high temperature resistive properties whereby the the high temperature generated by the gas generator is prevented from pyrolizing the inflatable cushion. The high temperature resistive fabric may be fashioned as a liner which wraps around a metallic heat shield and is interposed between the heat shield and the nylon-like fabric. Alternatively the inflatable cushion may be fabricated of two different types of materials with the high temperature resistive material being used in those areas closest to the gas generator and the conventional nylon-like fabric used for the remainder of the bag more distant from the gas generator.

3 Claims, 4 Drawing Sheets

LINER FOR INFLATABLE OCCUPANT RESTRAINT CUSHION

The invention relates to an inflatable occupant restraint system and more particularly to a cushion liner of high temperature resistive properties which prevents the fabric of the inflatable cushion from contacting hot metallic parts of the gas generator or of the metallic heat shield surrounding the gas generator.

BACKGROUND OF THE INVENTION

It is well known in vehicle occupant restraint systems to provide an inflatable nylon-like fabric bag which is inflated by a gas generator. The gas generator for the passenger inflatable restraint system is preferably a cylindrical metal housing which contains chemicals such as sodium azide, and has ports therein through which hot gases generated by a chemical reaction within the cylinder may be exhausted into the inflatable cushion to inflate the cushion.

The prior art has recognized that the chemical reaction heats the cylindrical housing to a high temperature of perhaps 500° C. The prior art patent U.S. Pat. No. 4,944,527 has taught the provision of a heat shield of stamped steel construction is formed in a cylindrical shape and has an open end through which the gas generator is inserted. Portions of the heat shield contact with the gas generator to positively locate and mount the gas generator within the heat shield, but this area of contact is preferably minimized so that the more substantial portions of the heat shield are spaced away from the gas generator to minimize the conduction of high temperature from the gas generator to the heat shield. The cylindrical walls of the heat shield are preferably slotted to define flaps which unfold in response to the flow of high temperature gas so that the flaps permit the free flow of the hot gas from the gas generator into the air bag and also spread the inflatable cushion fabric away from proximity with the hot gas generator.

The present invention recognizes that high temperatures caused by the chemical reaction within the gas generator may be conducted through the heat shield, particularly those portions of the heat shield which directly contact with the end of the gas generator cylinder. This high temperature conduction to the heat shield may tend to pyrolize the nylon-like fabric of the inflatable cushion and thereby introduce particulate matter into the occupant compartment.

SUMMARY OF THE INVENTION

According to the invention, an occupant restraining inflatable cushion apparatus includes a gas generator which generates a hot gas to inflate an inflatable fabric cushion of nylon-like material which is packaged about the gas generator in a deflated condition. The improvement comprises at least a portion of the inflatable cushion closest to the gas generator being a fabric having high temperature resistive properties whereby the the high temperature generated by the gas generator is prevented from pyrolizing the inflatable cushion. The high temperature resistive fabric may be fashioned as a liner which wraps around a metallic heat shield and is interposed between the heat shield and the nylon-like fabric. Alternatively the inflatable cushion may be fabricated of two different types of materials. The high temperature resistive material is used in those areas closest to the gas generator with the conventional nylon-like fabric used for the remainder of the bag more distant from the gas generator.

Accordingly, the object, feature, and advantage of the invention resides in the provision of a high temperature resistive fabric on at least that portion of the inflatable cushion which is in contact with the gas generator or its heat shield to prevent pyrolysis of the nylon-like inflatable cushion by the high temperatures of the gas generator and heat shield.

DESCRIPTION OF THE PREFERRED EMBODIMENT

Figure 1:
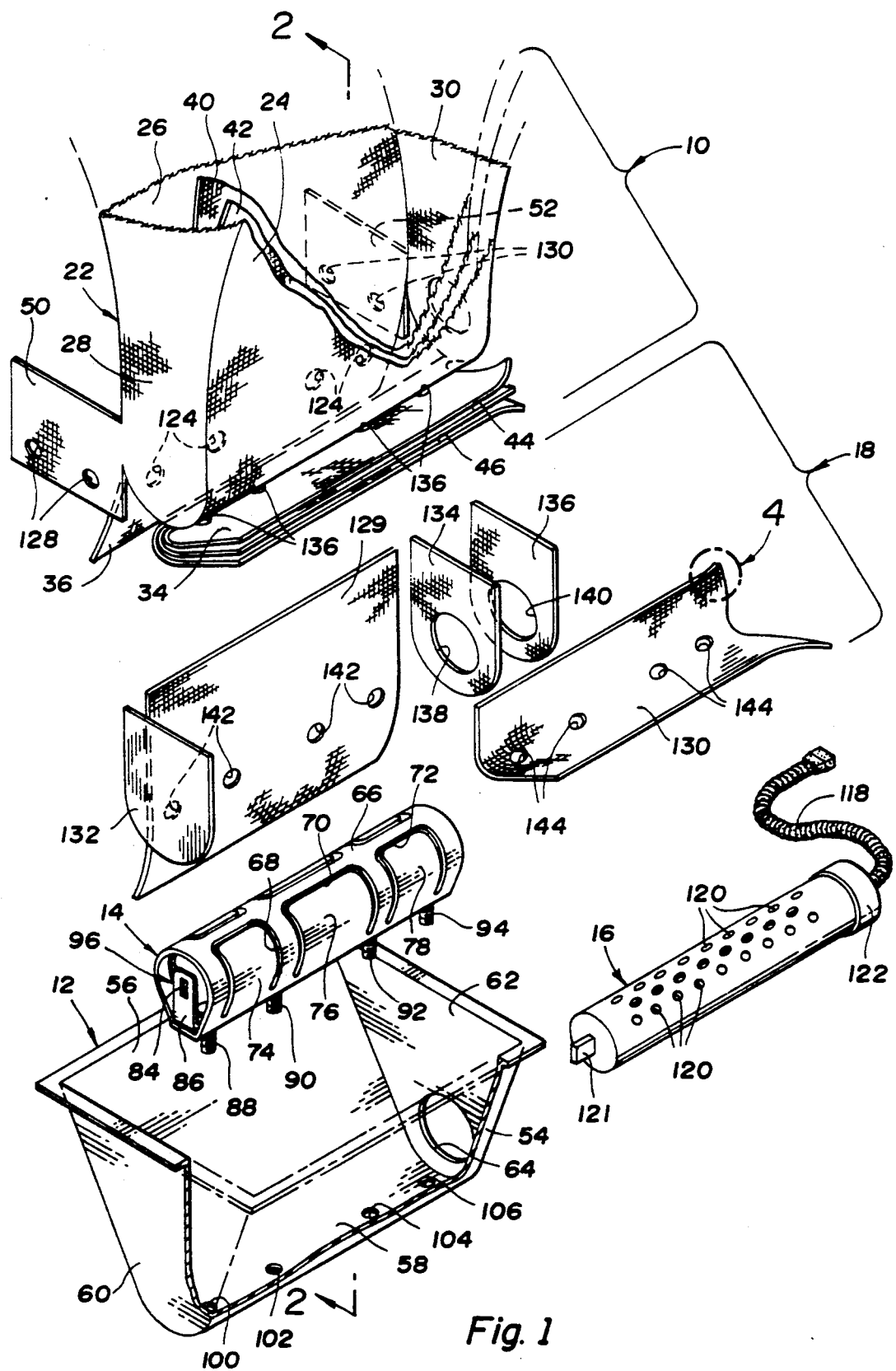
FIG. 1 is an exploded view of a inflatable occupant restraint cushion according to the invention.

A conventional occupant restraint system includes an inflatable cushion 10, mounting can 12, heat shield 14, and a gas generator 16. The present invention provides a high temperature resistive liner 18, as shown in exploded fashion in FIG. 1, to be described more particularly hereinafter.

Referring to FIG. 1 it is seen that the inflatable cushion 10 is a bag or pillow 22 fashioned of sewn together nylon-like fabric pieces. The bag 22 includes side walls 24 and 26 which are sewn together by end walls 28 and 30. The top of the bag, not shown in the drawings, is closed and the bottom of the bag is open and defined by a flap 34 of the side wall 24 and a flap 36 of the side wall 26. The bag 28 also includes two additional pieces of fabric 40 and 42 which are tethers having their upper ends, not shown, sewn to the inside of either the side walls 24 or 26 to give shape to the bag 22 when the bag is inflated by a high temperature gas as will be discussed hereinafter. The lower ends of the tethers 40 and 42 carry flaps 44 and 46. A pair of closure straps 50 and 52 extend from the end walls 28 and 30.

The mounting can 12 is a stamped steel member having side walls 54 and 56 connected along a spine 58 and having end panels 60 and 62. The end panel 62 has an access opening 64 through which the gas generator 16 may be inserted.

Figure 2:
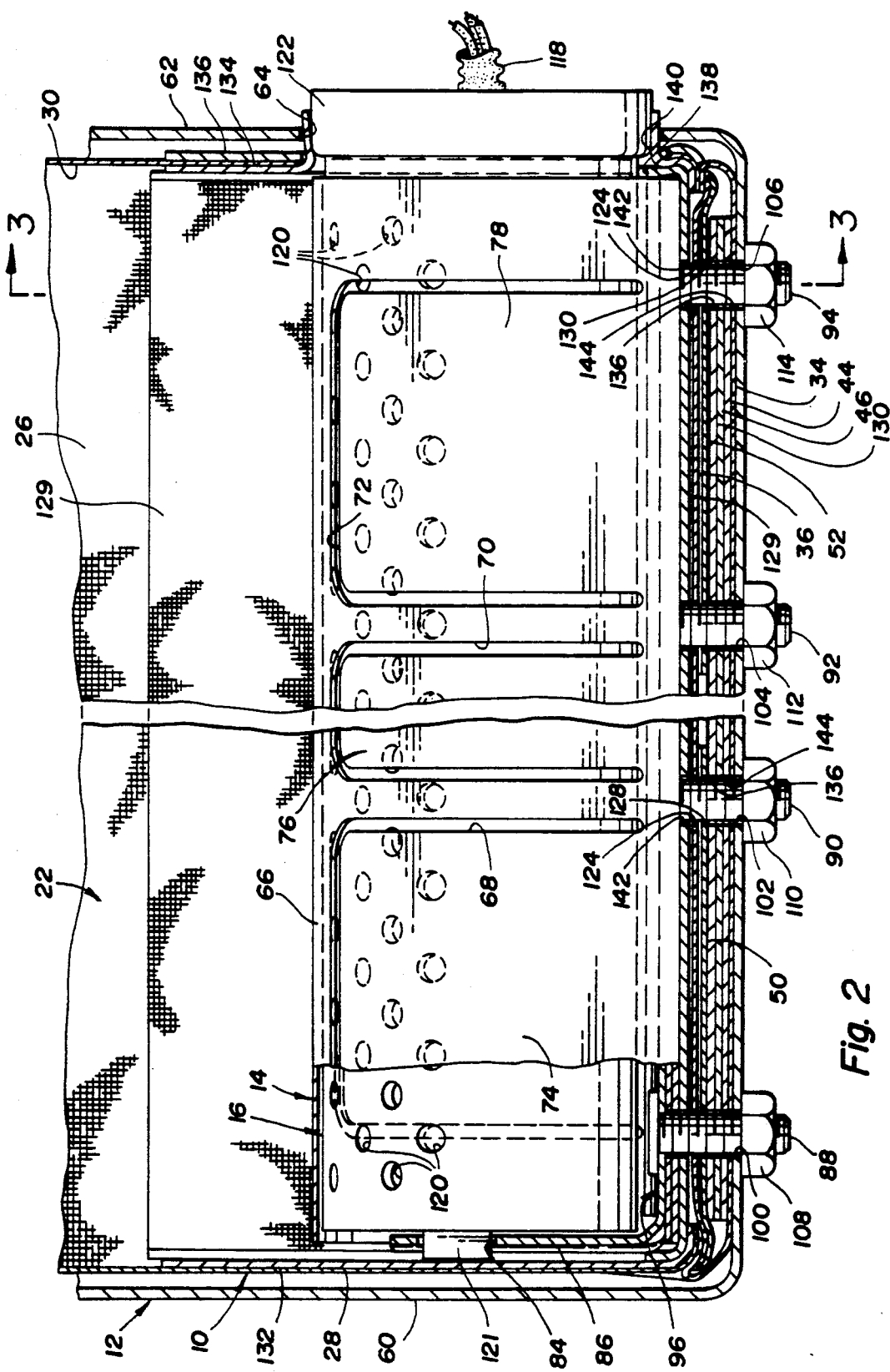
FIG. 2 is a section view taken in the direction of arrow 2—2 of FIG. 1 and showing a section of the inflatable occupant restraint cushion when fully assembled.

The heat shield 14 is of stamped steel construction and has a cylindrical wall 66 in which a series of slots are cut as at 68, 70 and 72 to define flaps 74, 76 and 78. The one end of the heat shield 14 carries a mounting tab 84 which projects into the cylindrical heat shield and has a rectangular mounting opening 86 therein. As best seen in FIGS. 1 and 2, the heat shield 14 may be fixedly attached to the mounting can 12 by a plurality of mounting bolts 88, 90, 92, and 94 which project downwardly from the heat shield 14. These mounting bolts are preferably connected together by a bolt carrier 96 which has the bolts, 88, 90, 92, and 94 suitably attached thereto along the length thereof. The mounting can 12 has bolt holes 100, 102, 104 and 106 spaced along the spine thereof through which the bolts 88, 90, 92, and 94 are installed. Nuts 108, 110, 112, and 114 are installed on these bolts as shown in FIG. 2.

The gas generator 16 is a cylindrical shaped housing having a chemical reaction chamber inside thereof and to which a actuator cable 118 extends. The gas generator 16 has a plurality of small ports 120 therein through which the hot gases created by the chemical reaction is exhausted into the inflatable cushion 10. The gas generator 16 carries a mounting projection 121 on the end thereof. The gas generator 16 is installed through the access opening 64 and the end wall 62 of mounting can 12 with the mounting projection 121 extending into the mounting aperture 86 of the mounting tab 84 of heat shield 84. An enlarged diameter end ring portion 122 of the gas generator 16 seats within the access opening 64 of end wall 62 as shown in FIG. 2. In this manner the gas generator is fixedly mounted within the mounting can 12.

The heat shield 14 is assembled into the air bag 22 by inserting the heat shield 14 up into the lower end of the bag. The flaps 36 are provided with a plurality of apertures 124 therein which register and align with the mounting bolts 88, 90, 92 and 94 so that the flap 36 may be wrapped around the heat shield 14. Then, the end straps 50 and 52 are wrapped around the heat shield. The end flap 50 has a pair of apertures 128 which fit over the mounting bolts 88 and 90. Similarly, the end strap 52 has a pair of apertures 130 which fit over the mounting bolts 92 and 94. Then, the flaps 34, 44, and 46 are folded over the heat shield 16 as permitted by the plurality of apertures 136 which register with one another and fit over the bolts, 88, 90, 92, and 94. By successively folding the flaps over the mounting bolts in this fashion, the inflatable cushion 22 is firmly anchored to the heat shield 14 and the mounting can 12 in a manner by which the hot gases generated by the gas generator 16 are prevented from leaking out the bottom end of the bag 22 and are directed in the opposite direction to inflate the bag 22.

The present invention provides a heat resistive liner of high temperature fabric which is interposed between the heat shield 14 and the inflatable cushion 22. As best seen in FIG. 1, the liner 18 is fashioned from a plurality of individual pieces of fabric including a pair of side pieces 129, and 130 and end pieces 132, 134, and 136. The pieces 129, 130, 132, 134, and 136 may be sewn to each other for installation inside the inflatable cushion 22 as a unit or the individual pieces may be stitched into the inflatable cushion 22. In either case, the side piece 128 is juxtaposed with the side wall 28 on the inside of the air cushion, while the side piece 130 is juxtaposed with the tether 46. The end piece 132 fits against the end wall 28 of the inflatable cushion 22 while the end piece 134 fits inside the inflatable cushion 22 against the inside of end wall 30 and the end piece 136 fits against the outside of the end wall 30. In this way the two end pieces 134 and 136 sandwich the end wall 30 therebetween as best seen in FIG. 2. The end pieces 134 and 136 have apertures 138 and 140 therein which respectively align with the access opening 64 in the end wall 62 of the mounting can 60 to receive the gas generator 16.

As best seen in FIG. 1, the side panel 128 has a plurality of apertures 142 and the side panel 136 has a plurality of apertures 144 by which these pieces may be installed over the bolts 88, 90, 92, and 94.

The fabric of the liner 18 is preferably an aluminized silica cloth which is commercially available as Catalog No. 8805K42 of the McMasters Car Supply Company, P.O. Box 4355, Chicago, Ill. 60680-4355. The cloth is preferably 0.054 inches thick and is rated to withstand temperatures of 1800° F.

Figure 3:
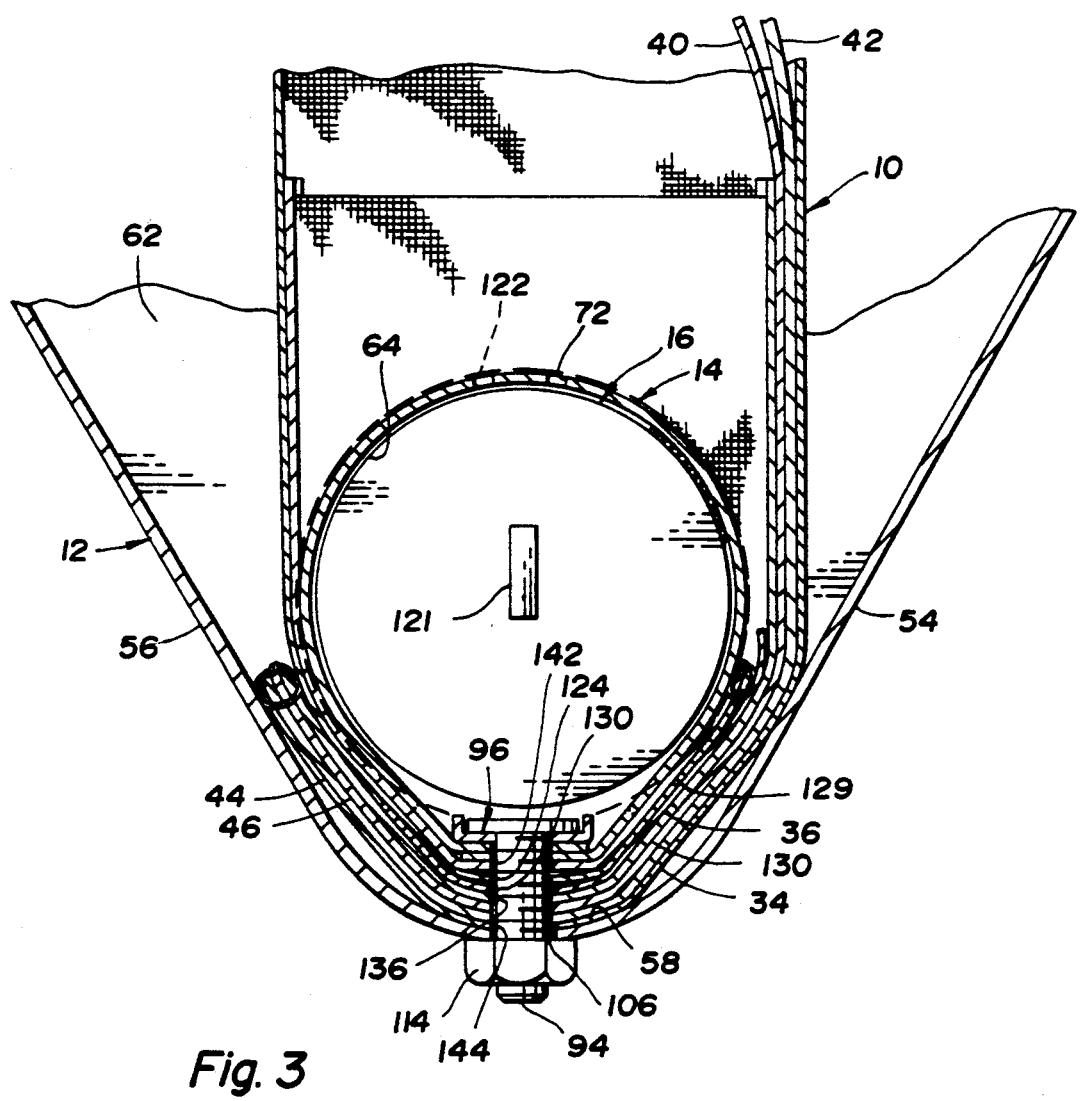
FIG. 3 is a cross-sectional view taken in the direction of arrows 3—3 of FIG. 2.

As best seen by reference to FIGS. 2 and 3, the side pieces 129 and 130 of the liner 18 are interposed between the heat shield 14 and the side walls 26 and 30 of the bag 22. Likewise, as seen in FIG. 2, the end piece 132 of the liner 10 is interposed between the heat shield 14, the heat shield tab 84 and the end wall 28 of the bag 22. At the other end of the heat shield, the end pieces 134 and 136 are respectively positioned on the opposite sides of the end wall 30 of the inflatable cushion 22 so as to protect the end wall against contact with either the heat shield 14 or the enlarged end 122 of the gas generator 16, and also to prevent contact with the region of the end wall 62 of the mounting can which is contacted by the enlarged end 122 of the gas generator 16.

Figure 4:
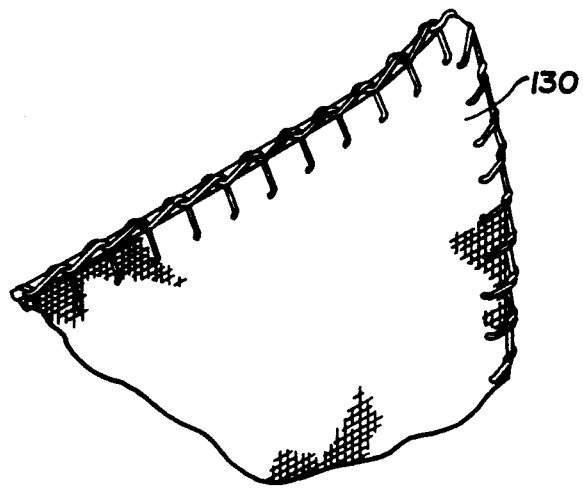
FIG. 4 is a perspective view of circled area of FIG. 1 show in an edge of the high temperature resistive fabric having stitches along the edged thereof to prevent unfraying of the fabric by the stream of high temperature gas emanating from the gas generator.

FIG. 4 is a view showing stitching along the edge of the side panel 130. This prevents the fabric from fraying in the hot gas stream as the bag is inflated.

In operation, the communication of an electrical current through the cable 118 to the gas generator 118 will initiate a chemical reaction causing hot gases to be expelled through the ports 120 of the gas generator 16. This hot gas passes through the slots 68, 70, and 72 of the heat shield 14 and causes the flaps 74, 76, and 78 thereof to fold open and permit unrestricted flow of gas into the bag 22. The high temperature resulting from the intense chemical reaction within gas generator 16 will heat the gas generator 16 to substantially high temperatures of about 500° C. Although the major portion of the heat shield 14 is spaced away from the gas generator 16 to effectively insulate the bag 22 from the high temperature, nonetheless, some high temperature is communicated into the heat shield 14 and the presence of the liner 18 of high temperature resistive fabric prevents this high temperature from pyrolizing the nylon-like fabric of the bag 22. The provision of this high temperature resistive lining material at the ends of the heat shield 14 and gas generator 16 also protects the bag 22 at the hot spots which occur where the mounting projection 121 of the gas generator 16 extends through the heat shield 14 and at the other end of the gas generator 16 where the gas generator 16 passes through the wall 62 of the mounting can 12.

Figure 5:
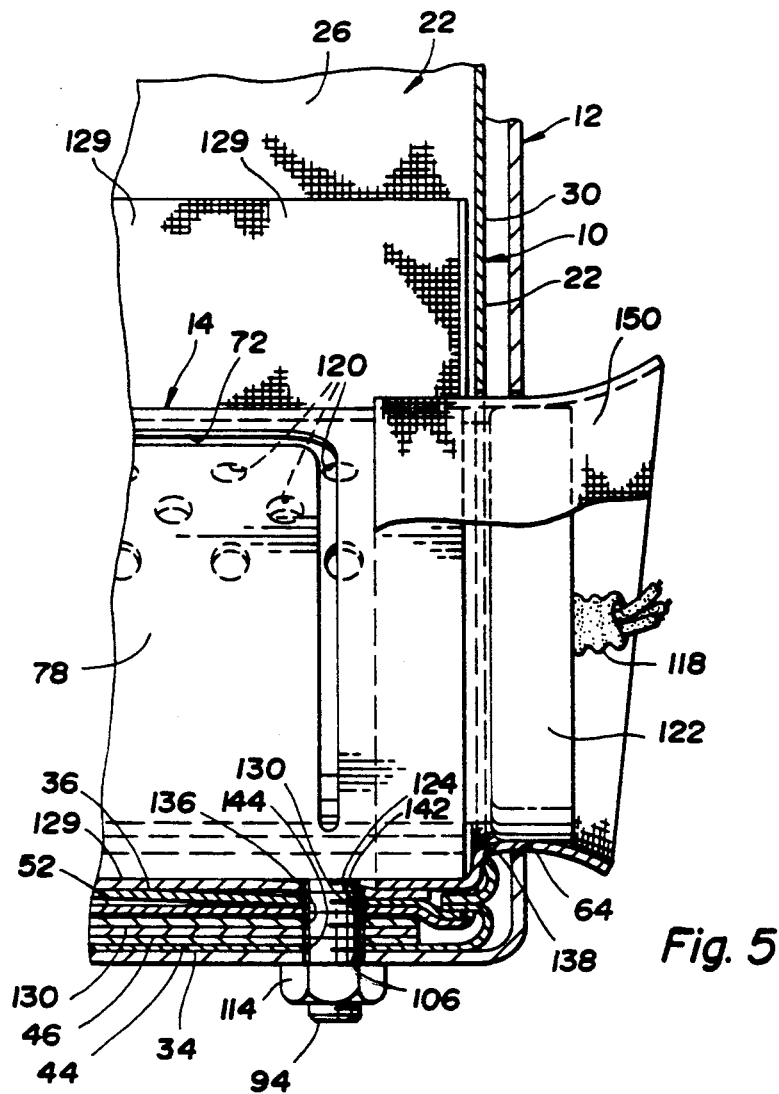
FIG. 5 is a cross-section view similar to FIG. 3 but showing a second embodiment of the invention.

FIG. 5 is a fragmentary view similar to FIG. 2 but showing a second embodiment of the invention in which like elements are indicated by the same reference numbers as in FIG. 3. However, in this embodiment a cylindrical collar 150 is stitched of the high temperature resistive fabric and surrounds the enlarged diameter end ring portion 122 of the gas generator 16. In this manner, the cylindrical collar 150 separates the end wall 30 of the bag, as well as the flap 36, from making contact with either the enlarged diameter end ring portion 122 of the gas generator 16 or with the end of the heat shield 14. The cylindrical collar 150 is preferably stitched to the bag 22 so that it remains securely in place. The cylindrical ring 150 eliminates the need for the end pieces 134 and 136 which had been provided in the first embodiment of FIGS. 1–4.

Figure 6:
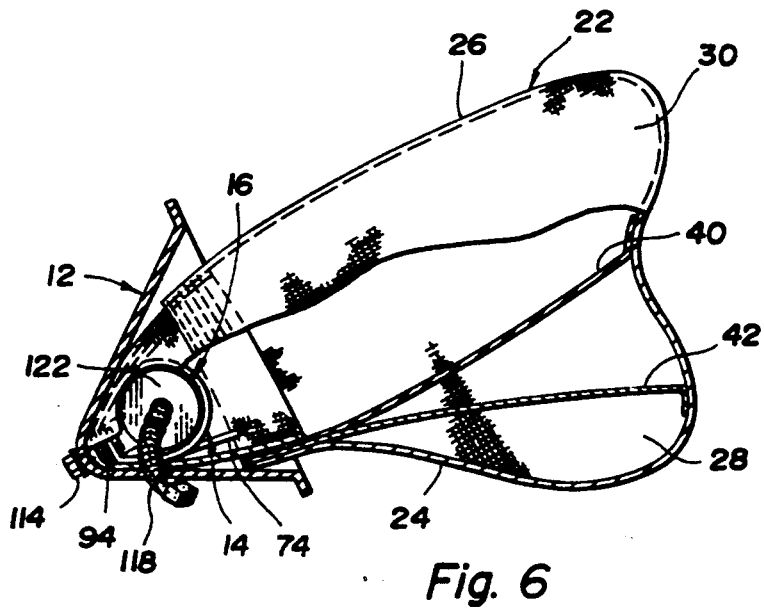
FIG. 6 is a schematic view of a third embodiment of the invention.

FIG. 6 is a simplified schematic view of an inflatable cushion assembly in which the like elements are indicated by like reference numerals. However, the construction of the bag 22 differs by virtue of the fact that the lower ends of the side walls 24 and 26 of nylon-like fabric stop well short of the gas generator 16. In this case the lower ends of the side walls 24 and 26 are stitched to a piece of high temperature resistive fabric which wraps around the heat shield 14 and the gas generator 16. Thus, the high temperature resistive fabric is exposed to the high temperatures while the nylon-like fabric of the bag 22 is distant from the high temperature surfaces.

Thus it is seen that the invention provides a new and improved inflatable occupant restraint where a liner of high temperature resistive material protects the inflatable cushion material from pyrolysis of high temperatures experienced by the gas generator and the heat shield.

The embodiments of the invention in which an exclusive property or privilege is claimed are defined as follows:

1. In combination, a cylindrical shaped gas generator including a cylindrical manifold containing chemicals for generating hot gas and having ports therein through which the hot gases exit the gas generator, a heat shield of cylindrical shape enclosing the gas generator and having an open end through which the cylinder may be inserted in to the heat shield and having portions of the heat shield spaced away from the gas generator to reduce the direct conduction of high temperature from the gas generator to the heat shield and having other portions of the heat shield contacting with the gas generator in order to provide a mounting relationship therebetween, an inflatable cushion of pyrolizible fabric tightly packaged about the heat shield in a deflated condition and being inflated by the hot gasses emanating from the gas generator, and a fabric of high temperature resistive properties carried by the inflatable cushion at least in those areas of the inflatable cushion contacting the heat shield and gas generator so that the high temperature of the gas generator and the high temperature conducted to the heat shield is experienced by the fabric of high temperature resistive property whereby the high temperatures generated by the gas generator are prevented from pyrolizing the inflatable cushion.

2. The combination of claim 1 further characterized by the fabric of high temperature resistive property being a piece of cloth which surrounds the gas generator and the heat shield and to which the inflatable cushion is joined at a point spaced away from the gas generator and the heat shield.

3. In combination, a cylindrical shaped gas generator including a cylindrical manifold containing chemicals for generating hot gas and having ports therein through which the hot gases exit the gas generator, a heat shield of cylindrical shape enclosing the gas generator and having an open end through which the cylindrical shaped gas generator may be inserted in to the heat shield and having portions of the heat shield spaced away from the gas generator to reduce the direct conduction of high temperature from the gas generator to the heat shield and having other portions of the heat shield contacting with the gas generator in order to provide a mounting relationship therebetween, an inflatable cushion of pyrolizible fabric tightly packaged about the heat shield in a deflated condition and being inflated by the hot gasses emanating from the gas generator, and a fabric liner of high temperature resistive properties carried by the inflatable cushion and sewn into the inflatable cushion at least in those areas of the inflatable cushion contacting the heat shield and gas generator so that the high temperature of the gas generator and the high temperature conducted to the heat shield is experienced by the fabric of high temperature resistive property whereby the high temperatures generated by the gas generator are prevented from pyrolizing the inflatable cushion.

* * * * *